(12) United States Patent
Hanson et al.

(10) Patent No.: US 7,571,397 B2
(45) Date of Patent: Aug. 4, 2009

(54) METHOD OF DESIGN BASED PROCESS CONTROL OPTIMIZATION

(75) Inventors: Jeffrey Hanson, Gresham, OR (US); Mark A. Giewont, Gresham, OR (US)

(73) Assignee: LSI Logic Corporation, Milpitas, CA (US)

( * ) Notice: Subject to any disclaimer, the term of this patent is extended or adjusted under 35 U.S.C. 154(b) by 510 days.

(21) Appl. No.: 11/265,040

(22) Filed: Nov. 2, 2005

(65) Prior Publication Data

US 2007/0099313 A1 May 3, 2007

(51) Int. Cl.
*G06F 17/50* (2006.01)
(52) U.S. Cl. .................. 716/2; 716/4; 716/5; 716/11
(58) Field of Classification Search .............. 716/1–2, 716/19–21, 4–5, 11
See application file for complete search history.

(56) References Cited

U.S. PATENT DOCUMENTS

2006/0236296 A1* 10/2006 Melvin et al. ................. 716/20
2007/0099313 A1* 5/2007 Hanson et al. ................ 438/14

* cited by examiner

*Primary Examiner*—Paul Dinh
(74) *Attorney, Agent, or Firm*—Suiter Swantz pc llo

(57) ABSTRACT

The present invention provides a method of design based process control optimization. In an embodiment, the method of design based process control optimization includes creating a circuit layout database including a design rule set. At least one algorithm is employed to query the circuit layout database to calculate at least one process specification limit. The method includes comparing the calculated at least one process specification limit with at least one predefined technology process tool capability to determine if the calculated at least one process specification limit allows for a manufacturable process. If the calculated at least one process specification limit does not allow for the manufacturable process, the limit may be re-optimized.

17 Claims, 3 Drawing Sheets

| Process Capabilities | Std. Dev. |
| --- | --- |
| Parameter A | 1.3 |
| Parameter B | 3.5 |

| Process Spec Limit Output | Parameter A | Parameter B | Sum A+B | Cpk A | Cpk B |
| --- | --- | --- | --- | --- | --- |
| Rev 1 | +/-9.5 | +/-9.5 | 19 | 2.5 | 0.9 |
| Rev 2 | +/-5 | +/-14 | 19 | 1.33 | 1.33 |

FIG. 3

| Process Capabilities | Std. Dev. |
| --- | --- |
| Parameter A | 1.3 |
| Parameter B | 3.5 |

| Process Limit Output | Parameter A | Parameter B | Sum A+B | Cpk A | Cpk B |
| --- | --- | --- | --- | --- | --- |
| Rev 1 | +/-12 | +/-12 | 24 | 3.2 | 1.1 |
| Rev 2 | +/-6 | +/-18 | 24 | 1.6 | 1.7 |

FIG. 4

| Process Capabilities | Std. Dev. |
| --- | --- |
| Parameter A | 1.3 |
| Parameter B | 3.5 |

| Process Spec Limit Output | Parameter A | Parameter B | Sum A+B | Cpk A | Cpk B |
| --- | --- | --- | --- | --- | --- |
| Rev 1 | +/-9.5 | +/-9.5 | 19 | 2.5 | 0.9 |
| Rev 2 | +/-5 | +/-14 | 19 | 1.33 | 1.33 |
| Rev 3 | +/-8 | +/-11.5 | 19.5 | 2.1 | 1./1 |

FIG. 5

METHOD OF DESIGN BASED PROCESS CONTROL OPTIMIZATION

FIELD OF THE INVENTION

The present invention relates generally to the field of process control and more particularly to a method of design based process control optimization.

BACKGROUND OF THE INVENTION

Process industries have developed various approaches to optimize or improve manufacturing (e.g., reducing manufacturing costs while improving manufacturing yield) in efforts to remain competitive in an ever increasing global economy. One approach has been to base process control limits on estimated or historical process capabilities. An additional approach is to set control limits based on a set of design rules that represent the most aggressive requirements allowed on the process technology.

Although the present approaches have assisted the optimization of process control, the approaches are limited under certain circumstances. First, basing process control limits on perceived tool or process capabilities is disadvantageous for the tool or process capabilities may not be sufficient to avoid yield loss or address reliability issues. For example, with such approach, process control limits often do not get modified until problems are encountered in high volume production. Thus, such limitation may have significant financial impact on manufacturing including the inability to meet customer delivery schedules. Further, the approach of setting control limits based on a set of design rules is unfavorable because the derivation of the process specification limits may be extremely time-consuming for such process is typically performed manually. In addition, adjustments for process exceptions that allow less or require more stringent requirements are also most often performed manually and thus, may be time intensive. Moreover, such adjustments are not usually made until either a yield or manufacturing constraint is encountered.

Therefore, it would be desirable to provide a method of determining and optimizing process control limits which allow the process control limits to be modified sufficiently to reduce yield loss or reliability issues.

SUMMARY OF THE INVENTION

In an aspect of the present invention, a method of design based process control optimization is provided. The method of design based process control optimization may include creating a circuit layout database including a design rule set. At least one algorithm may be employed to query the circuit layout database to calculate at least one process specification limit. The method may also include comparing the calculated at least one process specification limit with at least one predefined technology process tool capability to determine if the calculated at least one process specification limit allows for a manufacturable process. If the calculated process specification limit does not allow for the manufacturable process, the limit is re-optimized. For example, a re-optimization algorithm is employed to re-optimize all process inputs to maximize manufacturable capabilities.

In a further aspect of the present invention, a computer-readable medium having computer-executable instructions for performing a method for design based process control optimization is provided. The method may include creating a circuit layout database including a design rule set. In the present aspect, at least one algorithm may be employed to query the circuit layout database to calculate at least one process specification limit. The method may include comparing the calculated at least one process specification limit with at least one predefined technology process tool capability to determine if the calculated process specification limit allows for a manufacturable process. If the calculated at least one process specification limit does not allow for a manufacturable process, the at least one limit may be re-optimize.

In an additional aspect of the present invention, a method for design based process control optimization is disclosed. The method may include creating a design rule set. For example, the design rule set includes at least one technology process requirement, manufacturing requirement or design for yield requirement. The method may include employing at least one algorithm to query the design rule set to calculate at least one process specification limit. The calculated at least one process specification limit may be compared with the at least one technology process requirement, manufacturing requirement, or design for yield requirement to determine if the at least one process specification limit complies with the at least one technology process requirement, manufacturing requirement, or design for yield requirement. If the calculated at least one process specification limit does not comply with the at least one technology process requirement, manufacturing requirement, or design for yield requirement, the calculated at least one process specification limit may be optimized.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 3 is an example of a process specification limit optimization for manufacturability in accordance with an exemplary embodiment of the present invention;

FIG. 4 is an example of device specific process specification limit optimization for manufacturability in accordance with an exemplary embodiment of the present invention; and FIG. 5 is an example of a process specification limit optimization for design yield in accordance with an exemplary embodiment of the present invention.

DETAILED DESCRIPTION OF THE INVENTION

Reference will now be made in detail to the presently preferred embodiments of the invention, examples of which are illustrated in the accompanying drawings. It is to be appreciated that corresponding reference numbers refer to generally corresponding structures.

In general, a method of determining and optimizing process specification limits using software algorithms to minimize yield loss and maximize manufacturability of the product is provided. The disclosed method is advantageous for it includes automatic generation of process specification limits for a technology node, re-optimization of specification limits to maximize manufacturability, automatic generation of product specific specification limits determined by actual design layout which may vary from the technology specification limits, and identification of process limit requirements that do not meet user defined manufacturable requirements.

Figure 1:
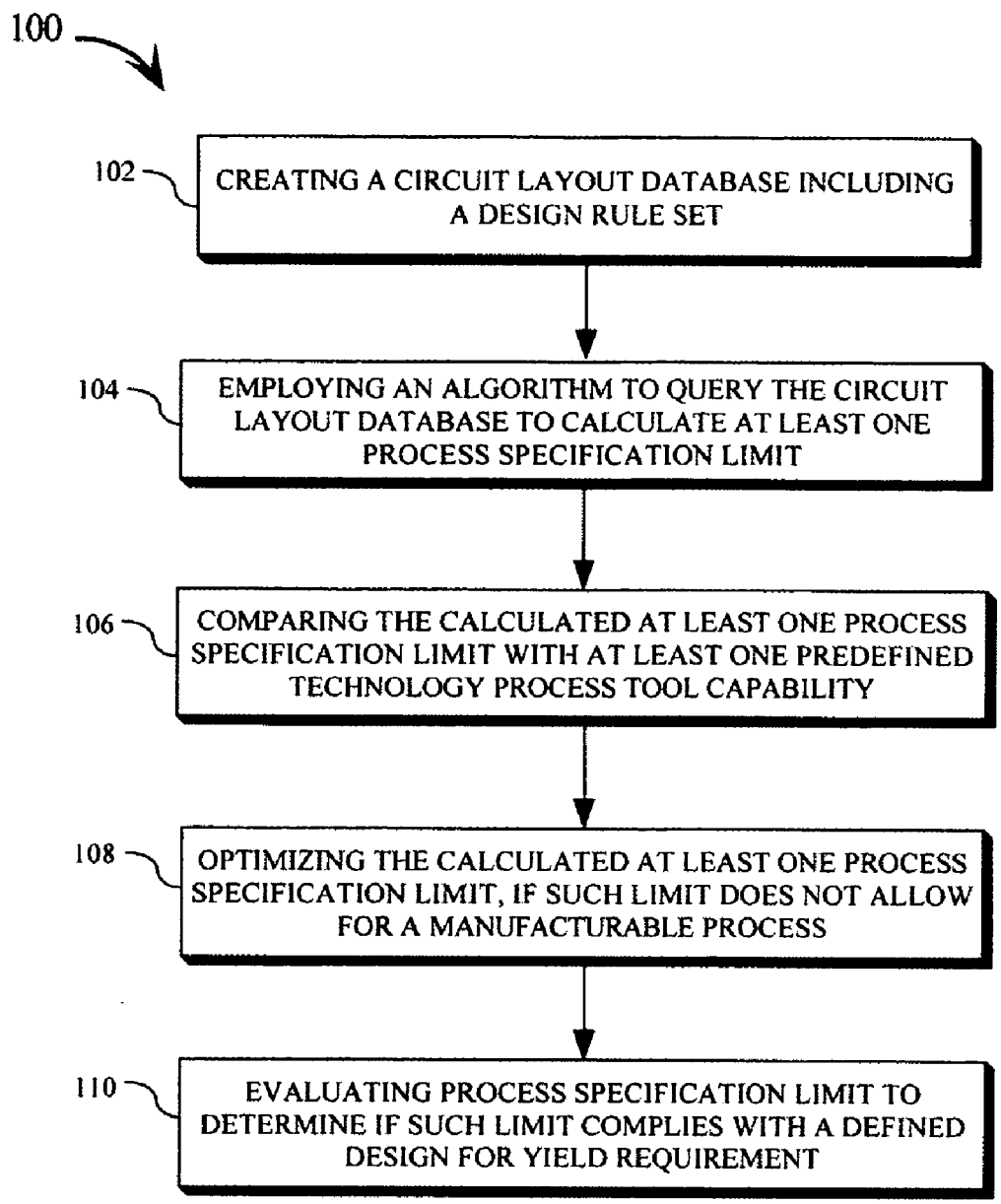
FIG. 1 is a flow chart of a method of design based process control optimization in accordance with an exemplary embodiment of the present invention.

Referring to FIG. 1, a method 100 of design based process control optimization is provided. In an exemplary embodiment, the method 100 of design based process control optimization may include creating a circuit layout database including a design rule set 102. For example, creating a circuit layout database 102 is constructed by use of software. In such example, the software adheres to the design rule set whereby the design rule set indicates allowable features such as an allowable feature dimension, an allowable feature spacing, an allowable feature density, and the like.

The method 100 may also include employing an algorithm to query the circuit layout database to calculate at least one process specification limit 104. For example, the at least one algorithm is a software algorithm. It is contemplated that additional algorithms may be generated including one which may query the actual graphic data system (GDS) layout to determine process specification limits accordingly.

In the present embodiment, the method 100 includes comparing the calculated at least one process specification limit with at least one predefined technology process tool capability 106. For instance, the at least one predefined technology process tool capability may include an estimated process tool capability, historical process tool capabilities and the like. In such instance, the calculated specification limits may be compared to historical (or estimated) process tool capabilities to determine if the calculated limits allow for a "manufacturable process." In an embodiment, the manufacturable process is user defined and may be quantified by measurements such as Cpk>1.33 (Cpk being a measure of the actual process capability), rework rate<2%, scrap rate<0.5%, yield>90%, and the like.

In an exemplary embodiment, if the calculated at least one process specification limit does not allow for the manufacturable process, the limit may be re-optimized 108. Moreover, a re-optimization algorithm may be employed to re-optimize all process inputs to maximize manufacturable capabilities. In a further embodiment, the method 100 includes evaluating the at least one process specification limit to determine if the at least one process specification limit complies with a defined design for yield requirement 110.

Figure 2:
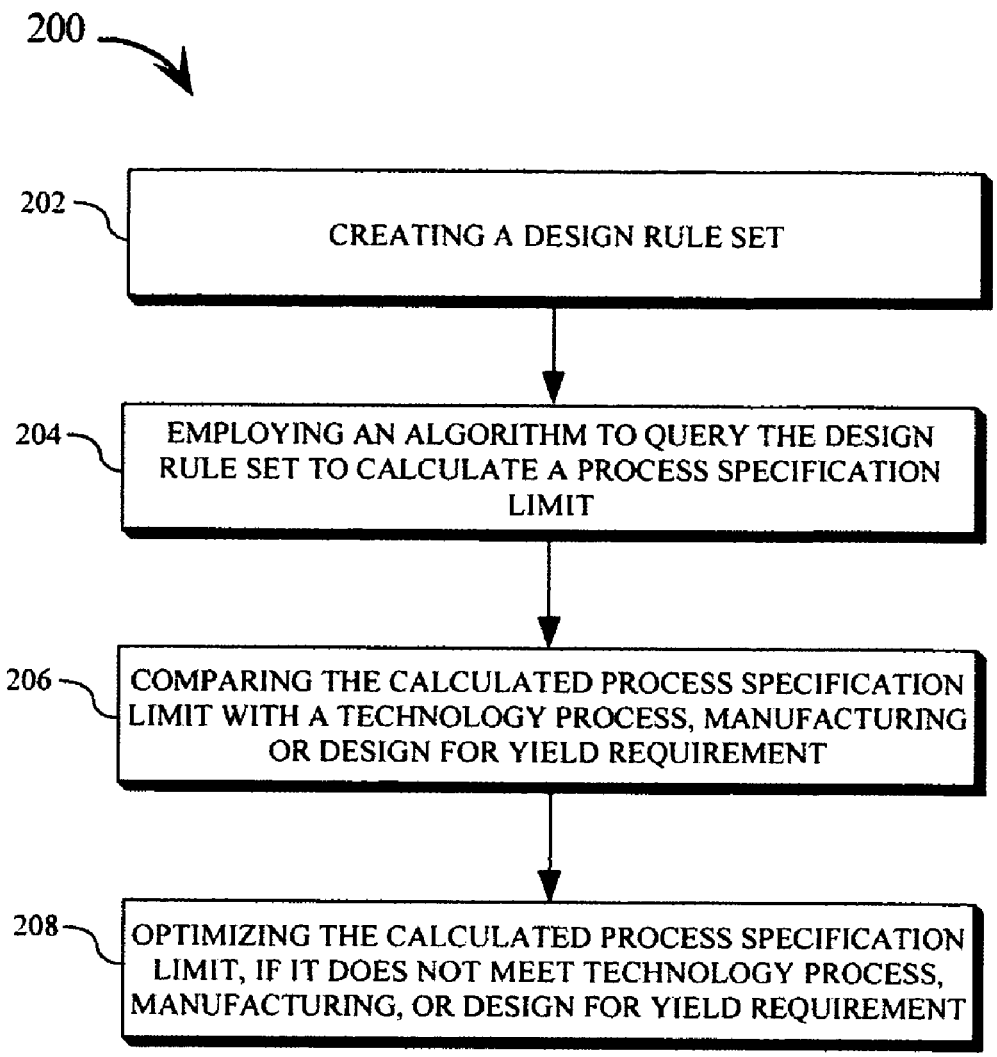
FIG. 2 is a flow chart in accordance with an additional method of design based process control optimization in accordance with an exemplary embodiment of the present invention.

Referring to FIG. 2, a method 200 for design based process control optimization is disclosed. In an exemplary embodiment, the method 200 includes creating a design rule set 202. For example, the design rule set includes at least one technology process requirement, manufacturing requirement or design for yield requirement. The method 200 may include employing at least one algorithm to query the design rule set to calculate at least one process specification limit 204. The calculated at least one process specification limit may be compared with the at least one technology process requirement, manufacturing requirement, or design for yield requirement to determine if the at least one process specification limit complies with the at least one technology process requirement, manufacturing requirement, or design for yield requirement 206. If the calculated at least one process specification limit does not comply with the at least one technology process requirement, manufacturing requirement, or design for yield requirement, the calculated at least one process specification limit may be optimized 208.

Referring to FIG. 3, an example of employing the method 100 of design based process control optimization in semiconductor manufacturing is provided. In the present example, the technology process requirement is set so that the sum of Parameter A and Parameter B is less than 20. Further, the manufacturability requirement is set to a Cpk measurement of greater than 1.3. As illustrated in FIG. 3, the calculated process specification limits for Rev1 meet the technology process requirements (i.e., sum of Parameter A and Parameter B are less than 20), but do not meet the manufacturability requirement of Cpk>1.3 (i.e., Cpk B is less than 1.3). Through an optimization algorithm, the new process specification limits for Rev2 meet both the technology process requirements and the manufacturability requirements (both Cpk A and Cpk B are >1.3). It is contemplated that the iterative process will highlight process steps where weaknesses exist between the design requirements and the manufacturing capabilities. Thus, in many instances, the iterative process is identifying the need for further process control improvements or hardware upgrades. It is contemplated that the iterative process may provide a more robust and cost effective process over prior art manufacturing methods for the present process allows a semiconductor manufacturer to quickly determine and implement process control limits that may ensure first pass success and does not rely upon costly yield excursions.

Referring to FIG. 4, an example of device specific process specification limit optimization for manufacturability in accordance with an exemplary embodiment of the present invention is provided. The present example employs similar parameters to those presented in FIG. 3 in which the technology process requirement is set so that the sum of Parameter A and Parameter B is less than 20 and the manufacturability requirement is set to a Cpk measurement of greater than 1.3. However, a less stringent device specific process requirement is imputed which allows for wider specification limits and possibly reduced manufacturing costs. As illustrated in FIG. 4, the device specific process requirement is set so that the sum of Parameter A and B is less than 25. Even with the relaxed process requirements, Rev1 output is not manufacturable whereby the CpK B value is not greater than 1.3. Therefore, the process specification limits are re-optimized and according to Rev2, the Cpk values for both Cpk A and Cpk B are greater than 1.3 and thus, such limits allow for a manufacturable process for the tested device.

In further exemplary embodiments, the disclosed invention is applied to a Design for Yield concept to search each device for special features that require more stringent process conditions. For example, lessons may have been learned regarding very specific layout features that pose particular manufacturing difficulties. One such example could be that metal lines spaced 0.4 um apart may be easily manufactured, however, metal posts with the same spacing result in electrical shorts that have to be compensated for by changes to the process specification limits. This concept is illustrated in the example presented in FIG. 5.

Referring to FIG. 5, an example of a process specification limit optimization for design yield in accordance with an exemplary embodiment of the present invention is provided. In the present example, the technology process requirement is set so that the sum of Parameter A and Parameter B is less than 20 and the manufacturability requirement is set to a Cpk measurement of greater than 1.3. Further, the historical yield loss process requirement or the Design for Yield requirement is set so that Parameter B is less than 12. As illustrated in FIG.

5, Rev1 meets the technology process requirement and the Design for Yield requirement, but does not meet the manufacturability requirement. Re-Optimization of Spec Limits in Rev2 meets process and manufacturability requirements, but fails the Design for Yield requirement (Parameter B is not less than 12). Following a second re-optimization of the process specification limit outputs, the yielded specification limits are optimized to minimize yield loss and maximize manufacturability. However, the original manufacturable requirement (Cpk>1.3) is not satisfied. The fact that Rev3 still does not meet the original manufacturable requirement Cpk>1.3 highlights the need for further process control improvements for parameter B. As control improvements are made through process or hardware changes, the new process capabilities may be processed through the algorithms to re-optimize the process spec limits to further reduce manufacturing or yield loss costs.

It is contemplated that the disclosed method may also be used as a method of "Advanced Process Control" that allows feed forward of process information from one step to the next. For example, the output specification results of one manufacturing process may be fed to other manufacturing process steps downstream. The downstream process steps may include requirements which may be changed in a manner that allows the overall result to meet design requirements, thus avoiding a scrap event. It is further contemplated that the disclosed method may be applied to any industry where design tolerances have an impact on manufacturing spec limits.

It is to be noted that the foregoing described embodiments according to the present invention may be conveniently implemented using conventional general purpose digital computers programmed according to the teachings of the present specification, as may be apparent to those skilled in the computer art. Appropriate software coding may readily be prepared by skilled programmers based on the teachings of the present disclosure, as may be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for design based process control optimization, comprising:
    creating, by using a computer, a circuit layout database including a design rule set;
    querying by employing at least one algorithm, the circuit layout database to calculate at least one process specification limit;
    comparing the calculated at least one process specification limit with at least one predefined technology process to determine if the at least one process specification limit allows for a manufacturable process;
    recalculating the at least one process specification limit, if the at least one process specification limit does not allow for the manufacturable process;
    performing a manufacturing process step for a semiconductor device according to the at least one process specification limit;
    feeding at least one output specification result of the manufacturing process step to a downstream manufacturing process step;
    comparing the at least one output specification result of the manufacturing process step with at least one predefined technology process to determine if the at least one output specification result allows for the manufacturable process;
    calculating at least one process specification limit for the downstream manufacturing process step, if the at least one output specification result does not allow for the manufacturable process; and
    performing a manufacturing process step for a semiconductor device according to the at least one process specification limit for the downstream manufacturing process step.

2. The method as claimed in claim 1, wherein the manufacturable process is user defined and quantifiable by measurements.

3. The method as claimed in claim 1, wherein the at least one predefined technology process includes an estimated process tool.

4. The method as claimed in claim 1, wherein the method for design based process control optimization is employed for semiconductor manufacturing.

5. The method as claimed in claim 1, further comprising evaluating the at least one process specification limit to determine if the at least one process specification limit complies with a defined design for yield requirement.

6. The method as claimed in claim 1, wherein the creating a circuit layout database is constructed by use of software.

7. The method as claimed in claim 6, wherein the software adheres to the design rule set, the design rule set indicating at least one of an allowable feature dimension, an allowable feature spacing, or an allowable feature density.

8. A computer-readable medium having computer-executable instructions for performing a method for design based process control optimization, the method comprising:
    creating a circuit layout database including a design rule set;
    querying by employing at least one algorithm, the circuit layout database to calculate at least one process specification limit;
    comparing the calculated at least one process specification limit with at least one predefined technology process to determine if the at least one process specification limit allows for a manufacturable process;

recalculating the at least one process specification limit, if the at least one process specification limit does not allow for the manufacturable process;

performing a manufacturing process step for a semiconductor device according to the at least one process specification limit;

feeding at least one output specification result of the manufacturing process step to a downstream manufacturing process step;

comparing the at least one output specification result of the manufacturing process step with at least one predefined technology process to determine if the at least one output specification result allows for the manufacturable process;

calculating at least one process specification limit for the downstream manufacturing process step, if the at least one output specification result does not allow for the manufacturable process; and performing a manufacturing process step for a semiconductor device according to the at least one process specification limit for the downstream manufacturing process step.

9. The computer-readable medium as claimed in claim 8, wherein the manufacturable process is user defined and quantifiable by measurements.

10. The computer-readable medium as claimed in claim 8, wherein the at least one predefined technology process includes an estimated process tool capability.

11. The computer-readable medium as claimed in claim 8, wherein the method for design based process control optimization is employed for semiconductor manufacturing.

12. The computer-readable medium as claimed in claim 8, wherein the method further comprises evaluating the at least one process specification limit to determine if the at least one process specification limit complies with a defined design for yield requirement.

13. The computer-readable medium as claimed in claim 8, wherein the design rule set indicates at least one of an allowable feature dimension, an allowable feature spacing, or an allowable feature density.

14. A method for design based process control optimization, comprising:

creating, by using a computer, a design rule set, the design rule set including at least one technology process requirement, manufacturing requirement or design for yield requirement;

employing at least one algorithm to query the design rule set to calculate at least one process specification limit;

comparing the at least one process specification limit with the at least one technology process requirement, manufacturing requirement, or design for yield requirement to determine if the at least one process specification limit complies with the at least one technology process requirement, manufacturing requirement, or design for yield requirement;

recalculating the at least one process specification limit, if the at least one process specification limit does not comply with the at least one technology process requirement, manufacturing requirement, or design for yield requirement performing a manufacturing process step for a device according to the at least one process specification limit;

feeding at least one output specification result of the manufacturing process step to a downstream manufacturing process step;

comparing the at least one output specification result of the manufacturing process step with a second at least one technology process requirement, manufacturing requirement, or design for yield requirement to determine if the at least one output specification result complies with the second at least one technology process requirement, manufacturing requirement, or design for yield requirement;

calculating at least one process specification limit for the downstream manufacturing process step, if the at least one output specification result does not comply with the second at least one technology process requirement, manufacturing requirement, or design for yield requirement; and performing a second manufacturing process step for the device according to the at least one process specification limit for the downstream manufacturing process step.

15. The method for design based process control optimization as claimed in claim 14, wherein the design rule set includes at least one device specific process requirement.

16. The method for design based process control optimization as claimed in 15, further comprising comparing the at least one process specification limit with the at least one device specific process requirement.

17. The method for design based process control optimization as claimed in claim 14, wherein the method for design based process control optimization is employed for semiconductor manufacturing.

* * * * *